3,297,942
ELECTRON TUBE TRANSCONDUCTANCE TESTING CIRCUIT HAVING TRANSISTORIZED PLATE CURRENT SWITCHING MEANS
Joseph E. Clevenger, Jr., and Clifford M. Siegel, Charlottesville, Va., assignors to the United States of America as represented by the Secretary of the Army
Filed Feb. 6, 1963, Ser. No. 256,778
1 Claim. (Cl. 324—27)

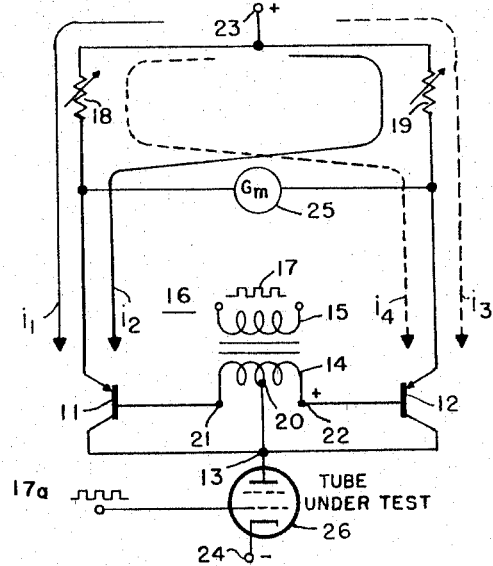
Jan. 10, 1967   J. E. CLEVENGER, JR., ET AL   3,297,942
ELECTRON TUBE TRANSCONDUCTANCE TESTING CIRCUIT HAVING
TRANSISTORIZED PLATE CURRENT SWITCHING MEANS
Filed Feb. 6, 1963
INVENTORS,
JOSEPH E. CLEVENGER JR,
CLIFFORD M. SIEGEL
BY
Harry M. Saragovitz
ATTORNEY.

This invention relates to an electron tube tester, and more particularly to a transistorized transconductance indicator circuit for an electron tube tester.

The circuit of this invention is the result of a project for determining the feasibility of automatizing electron tube testers. The major purpose of the project was to reduce the operator's responsibility for test set-ups and thus reduce the chance of his making an error. The study revealed that current tube testers often do not give a clear indication of tube conditions. Most tube testers measure only one quantity to determine the condition of the plate current characteristics of a tube. The simpler testers measure "emission" whereas the more elaborate testers measure transconductance. The results of these two types of measurement might often be different. Also, these measurements can be made under a variety of conditions, yielding a variety of results.

The type of results obtained can be largely attributed to the manner in which a tester measures transconductance. As an example of the prior art, the TV-2/U, an electron tube tester used by the Department of the Army will be considered. The voltage applied to the plate of the tube under test consists of half sine-wave positive pulses, starting at zero voltage and occurring at a rate of 120 per second. The grid consists of a 60 c.p.s. sinusoidal voltage. Hence, half of the plate voltage pulses occurs while the grid signal voltage is positive, producing one component of average plate current. The other half of the plate voltage pulses occurs while the grid signal is negative, thereby producing a different component of average plate current. The difference between these two components drives a meter which reads "percent quality." It reflects the status of transconductance over a wide range of plate voltages rather than at some one plate voltage.

A tester such as the TV-2/U, which in effect measures transconductance at prescribed electrode voltages, gives results, the significance of which is not known without additional information which a tester such as this does not supply. The TV-2/U readily responds to reduced emission; however, it gives a similar response to factors other than reduced emission. If the reason for low transconductance is low emission, then the tube quality is unsatisfactory and completely untrustworthy. However, if the reason involves parmeters other than emission, then low transconductance may simply indicate a failure or difficulty in establishing proper plate current by the external circuit. In summary it can be said that the value of transconductance or of "percent quality" is significant only when the value of plate current at which it is measured is known.

In prior art tube testers a number of meter adjustments are necessary. For example, in the TV-2/U, three meter adjustments are required. First is the meter range adjustment; second, the sensitivity adjustment; and third, the meter zero adjustment. In the tube tester of this invention the only adjustment to be made is the range adjustment. Since the transconductance indicator circuit disclosed herein is to be incorporated in a semi-automatic tube tester, a required feature is an indicating system which requires no initial balancing or sensitivity adjustments.

A problem posed by filament supply voltages in tube testers is that of hum. Tubes with filamentary-type cathodes have an alternating component of plate current which is the result of cathode voltage variations at the filament supply frequency. This hum causes inaccurate transconductance readings and must be minimized.

The most difficult problem encountered in the development of the transconductance indicator circuit of this invention was finding a method for measuring small alternating currents (on the order of 50 microamperes or less). Conventional rectifier circuits could not be used because of the square-law detecting characteristics inherent in rectifiers at low current.

It is therefore an object of this invention to provide an improved transconductance indicator circuit.

A more specific object is to provide a transconductance indicator circuit which is capable of providing accurate readings even at low values of current.

Another object is to eliminate inaccurate readings in transconductance indicator circuits which are due to electron tube filament voltage.

A further object of this invention is to provide a transconductance circuit which requires a minimum of adjustment.

Another object of this invention is to provide a tube tester which gives a clearer indication of tube conditions than does the prior art type testers.

In practicing this invention a transconductance indicating circuit is provided which comprises a transistor switching circuit that acts as a gated rectifier. A gating signal is fed to a transformer, the secondary of which has its ends connected to the bases of a pair of transistors. The center tap of the secondary is connected to the collectors of the transistors and to the plate of the tube under test. A bias resistor is in each emitter circuit, and the transconductance indicating meter is connected between the two emitters. When a signal, which is synchronous with the gating signal, is applied to the grid of the tube, the current in one transistor will decrease while that in the other transistor will increase, thereby producing a current through the meter which will be indicative of the transconductance of the tube. Plate voltage and plate current indicating circuits are appropriately placed in the tube tester to provide in conjunction with the transconductance indicator, a clear indication of tube conditions.

Other objects, features and advantages of this invention will become more apparent from the following detailed description particularly when taken in connection with the following drawings wherein:

FIG. 1 is a schematic circuit diagram of a switching circuit designed in accordance with this invention; and FIG. 2 is an electron tube tester circuit having plate voltage, plate current and transconductance indicating circuits.

The transconductance of an electron tube can be measured by applying an alternating voltage of known magnitude to the control grid of the tube and observing the alternating component of plate current which results. The transconductance, $G_m$, follows from the known approximate relation:

$$G_m = \frac{\Delta i_p}{\Delta e_g}\bigg|_{e_p = k}$$

The circuit according to this invention which measures the change in plate current is shown in FIG. 1. As stated previously, conventional rectifier circuits could not be used because of the square-law detecting characteristic inherent in rectifiers at low current. To overcome this difficulty, two transistors are used in a gated rectifier circuit. A square wave of voltage applied to the bases of the transistors provides nearly ideal switching of collector current.

In FIG. 1 two PNP transistors 11 and 12 have their collectors connected to a common point 13. The bases of transistors 11 and 12 are connected to ends 21 and 22 respectively of the secondary winding 14 of a transformer 16, the primary winding 15 being connected to a square wave pulse source which is represented by pulse train 17. Center tap 20 of winding 14 is connected to common point 13. Variable range resistor 18 is connected between the emitter of transistor 11 and terminal 23, a source of positive bias potential, while the emitter of transistor 12 is connected to terminal 23 by a variable range resistor 19. An ammeter 25 is connected between the emitters of the two transistors. A vacuum tube 26, which is to be tested, has its plate connected to junction point 13 and its cathode connected to terminal 24, the bias supply common terminal. The control grid of tube 26 is coupled to the square wave source to which the transformer 16 is coupled and the signal appearing at this point is represented by 17a.

In the operation of FIG. 1, it is first assumed that there is no signal applied to the grid of the tube 26 under test; i.e., the plate current is D.C. only. If a square wave signal 17 were applied to the primary winding 15, then while terminal 22 of secondary winding 14 (marked +) is positive, the base of transistor 12 is also positive and the base of transistor 11 is negative. Under these conditions transistor 11 is "on" and transistor 12 is "off." Thus, plate current flows through the paths $i_1$ and $i_2$, $i_2$ flowing through the meter 25. On the next half cycle of gating voltage the situation is reversed; transistor 12 is "on," and transistor 11 is "off," and currents $i_3$ and $i_4$ flow. In this case, current $i_4$ flows through the meter 25 in a direction opposite to that of $i_2$. As a result there is no net direct current flowing through the meter and it therefore indicates "zero." The resistors 18 and 19 must be matched or the currents $i_2$ and $i_4$ would differ and the meter would indicate the difference.

Now, assume that a signal 17a, which is similar to the gating signal 17, is applied to the grid of tube 26 in such a manner that the grid is positive when the base of transistor 11 is negative. This situation will result in more plate current $(i_1+i_2)$ than in the steady state condition described above. On the negative half-cycle of the control grid voltage, when transistor 12 is "on" less current $(i_3+i_4)$ flows than in the steady state condition. Since $i_2$ is greater than steady-state $i_2$, and $i_4$ is less than steady-state $i_4$, there is a net D.C. current which flows through the meter. This current, $i_m$, is:

$$i_m = i_2 - i_4$$

and flows from right to left through the meter.

The current, $i_m$, is proportional to the change in plate current, $\Delta i_b$, for the tube 26 under test; the proportionality being:

$$i_m = \left(\frac{R}{2R + R_m}\right) \Delta i_b$$

where R is the resistance of resistors 18 and 19, and $R_m$ is the meter resistance.

In a particular example, five ranges are provided for measuring transconductance. They are: 0–300, 1000, 10,000 and 30,000. Each range may be selected by adjusting resistors 18 and 19 to the proper value.

An important feature of the gated rectifier circuit described above which is very useful in a transconductance indicator circuit is the frequency selectivity of the network. It may be considered to be a synchronous detector in the sense that it responds only to power (or current) at the gating frequency. For this reason, any alternating component of plate current which results from A.C. filament power will appear as an A.C. component of the meter current, $i_m$. Since the meter will not respond to alternating current, filament hum is cancelled in the indicating circuit, and thus it does not cause errors in the transconductance measurement.

The necessary condition for this cancellation is that the gating frequency be different from the frequency of the unwanted power. This condition is met by using a 1000 cycle per second gating and grid-drive signal. Thus, adequate frequency separation exists between the gating signal and the filament power, 60 or 400 c.p.s., as well as the second harmonics of filament power, 120 or 800 c.p.s.

FIG. 2 is a schematic diagram showing the relative positions of the plate voltage, plate current, and transconductance indicating circuits with respect to the tube under test. Also included in this figure is the pulse generator circuitry. Circuit elements in FIG. 2 are designated by primed numerals where they correspond to elements in FIG. 1.

The signal generator which provides the square wave pulses (shown at 17 and 17a in FIG. 1) is generally represented by numeral 50 in FIG. 2. The pulse source is an R-C coupled astable multivibrator comprising two PNP transistors 51 and 52. Capacitor 53 couples the collector of transistor 51 to the base of transistor 52, and capacitor 54 couples the collector of transistor 52 to the base of transistor 51. Resistors 55 and 56 connect the base and collector respectively of transistor 51 to a source 59 of positive bias potential. Resistors 57 and 58 connect the collector and base respectively of transistor 52 to source 59. These resistors provide bias voltages to transistors 51 and 52 and also provide charging paths for capacitors 53 and 54. The emitters of transistors 51 and 52 are directly connected to the bias supply common lead 24'.

An emitter follower transistor 60 acts as an output or buffer stage for the multivibrator. The collector of transistor 60 is directly connected to source 59 while its base is coupled to source 59 through a resistor 61. The output from the multivibrator which is taken from the collector of transistor 52 is coupled to the base of transistor 60 by a capacitor 62. Resistors 63, 64 and 65 are connected in series between the emitter of transistor 60 and the common lead 24'. These resistors are bypassed by a capacitor 66. The voltages which appear across resistors 63, 64 and 65 are respectively coupled to the stationary contacts 67, 68 and 69 of a switch 70. By setting movable switch contact 71 to the proper stationary contact the desired amplitude of grid signal may be coupled to tube 26'. Voltages of ½, 1 and 2 volts, for example, may be made available at terminals 65, 64 and 63 respectively. The voltage appearing at the emitter of transistor 60 is coupled through capacitor 72 to the primary winding 15'.

In order to make the range of the transconductance indicator circuit adjustable in discrete steps, any one of resistors 80, 82, 84, 86 or 88 may be connected to terminal 90, and the corresponding one of resistors 81, 83, 85, 87 or 89 is therefore connected to terminal 91.

It has been mentioned hereinabove that the transconductance measurement yields more information concerning the condition of an electron tube if the D.C. plate voltage and plate current are also measured. In view of this, two indicating circuits, plate voltage and plate current, are employed in the tube tester of this invention in addition to the transconductance indicating circuit.

The plate voltage indicating circuit is a basic voltmeter circuit which uses a microampere meter movement 93. The series combinations of switch 94 and resistor 95 and of switch 96 and resistor 97 are connected in parallel between meter 93 and the common line 24'. Either one of two possible voltage ranges can be selected by switching either of resistors 95 or 97 in series with the meter 93.

D.C. plate current for the tube under test is also measured with a conventional circuit. A milliammeter 98 is connected between point 13' and the plate of tube 26'. The series combinations of switch 99 and resistor 100 and of switch 101 and resistor 102 are connected in parallel with meter 98. Three ranges are thus provided: one with no shunt resistor and one with either resistor 100 or resistor 102.

The transconductance test of pentodes can be performed adequately using one power supply for both the plate and the screen grid. In this case the tube is still tested as a pentode, but with equal potentials on the plate and screen grid, and the alternating current in the plate lead only is measured to give the indication of transconductance. This principal is used in the tester of this invention, the screen grid of tube 26' being directly connected to source 23' by a lead 104.

What is claimed is:

An electron tube transconductance testing circuit comprising: a direct current power supply having positive and negative terminals; first and second resistors connected to said positive terminal; a vacuum tube to be tested having plate, grid and cathode electrodes and means for heating said cathode electrode, said cathode being connected to said negative terminal; first and second transistors each having emitter, collector and base electrodes, the emitters of said first and second transistors being respectively connected to said first and second resistors and the collectors thereof being connected to said plate electrode; an ammeter connected between the emitters of said first and second transistors; a transformer having primary and secondary windings, said secondary having a centertap connected to said plate electrode; the ends of said secondary winding being respectively connected to the bases of said first and second transistors; generator means for generating a square wave voltage, the frequency of which is different from the fundamental and second harmonic of the power supplying said cathode heating means; an emitter follower transistor having at least a base electrode and an emitter electrode; a plurality of resistors connected in series between said emitter electrode of said emitter follower and said negative terminal; the base electrode of said emitter follower being coupled to said square wave generator; means coupling the emitter of said emitter follower to said primary winding; and a switch having a movable contact connected to said grid electrode and a plurality of fixed contacts connected to the junctions between said plurality of series connected resistors.

References Cited by the Examiner
UNITED STATES PATENTS

| 1,999,858 | 4/1935 | Barnhart | 324—27 |
| 2,903,644 | 9/1959 | Weiss et al. | 324—26 |

OTHER REFERENCES

Motorola Power Transistor Handbook (first edition), pages 112–114.

WALTER L. CARLSON, *Primary Examiner.*

E. L. STOLARUN, C. F. DUFFIELD,
*Assistant Examiners.*